Dec. 28, 1937.   O. I. JUDELSHON   2,103,464
DRIVE FOR LATHES AND OTHER MACHINES
Filed Aug. 24, 1935   2 Sheets-Sheet 1
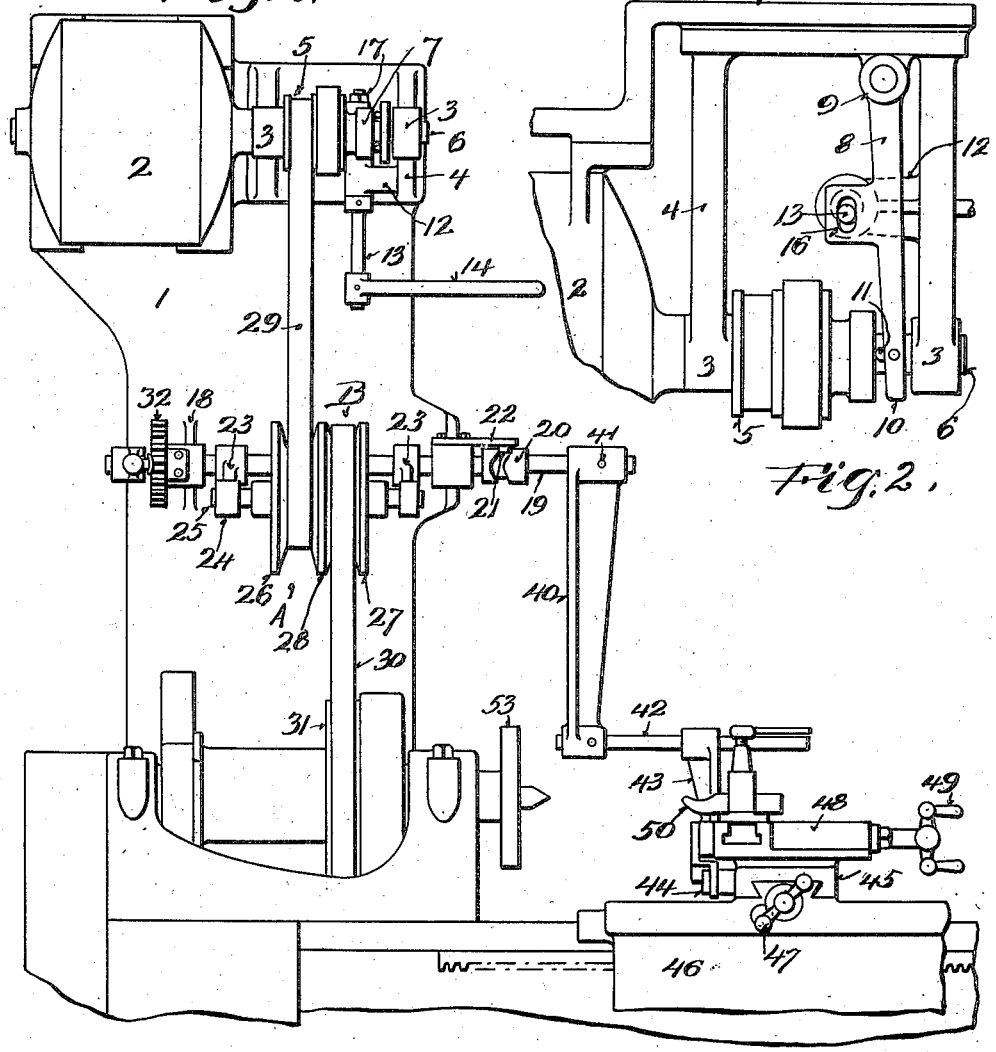

Dec. 28, 1937.  O. I. JUDELSHON  2,103,464
DRIVE FOR LATHES AND OTHER MACHINES
Filed Aug. 24, 1935  2 Sheets-Sheet 2
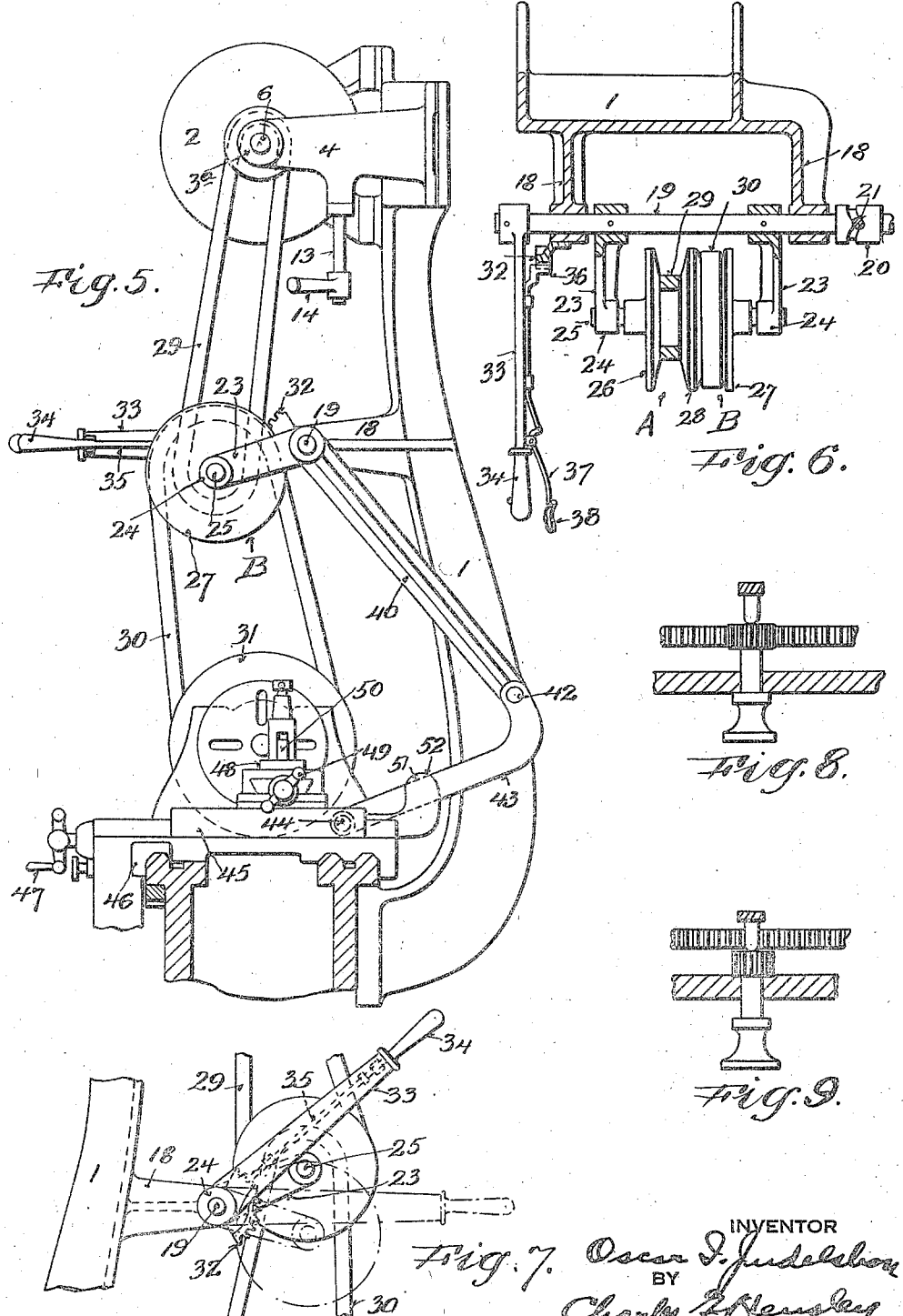

Patented Dec. 28, 1937

2,103,464

UNITED STATES PATENT OFFICE 2,103,464

DRIVE FOR LATHES AND OTHER MACHINES

Oscar I. Judelshon, Park Ridge, N. J.

Application August 24, 1935, Serial No. 37,713

4 Claims. (Cl. 82—21)

In Letters Patent No. 2,035,269, dated March 24, 1936, I showed and described variable speed drive devices for driving various types of machines at different speeds, and the present invention embodies a variable speed drive such as is described therein.

The object of the present invention is to so combine a variable speed drive with a lathe or other type of machine, that the speed of the drive will be automatically varied as a piece of work is being executed on the lathe or other machine, in order that the speed at various times may accord or be adapted to the work being performed on the machine.

Heretofore, in turning face plates and discs and cones of various shapes on a lathe, the operator would set the tool to start, say, near the center or axis of the plate or other piece of work, and place the belt which transmits the power from the countershaft to the lathe so that the shaft of the lathe would turn at relatively high speed while the tool is operating on the piece of work relatively near the axis, because the surface speed of the work in relation to the tool is relatively slow while the tool is operating near the axis of the piece of work.

After the operation is continued for a time it is customary to stop the lathe and then shift the belt on the stepped pulleys to reduce the speed of revolution of the shaft or spindle of the lathe, so that the surface speed of the work in relation to the tool will not be too high, or, in other words, as the diameter at the point where the tool is working is increased, the revolution of the shaft per minute is decreased. In cutting a large face plate, cone or other object, the machinist usually stops the lathe several times to change the speed of revolution, and this not only consumes time but each time the lathe is stopped to change the speed, a tool mark is left on the piece of work.

With my present invention it is possible to execute the entire piece of work without stopping the shaft of the lathe or other machine, but the speed of the lathe shaft is automatically varied in accordance with the progress of the work performed by the tool, so that the speed is automatically reduced as the work progresses from a point near the axis toward the outer portion. In this manner the entire face plate or other piece of work may be machined without interruption from the very beginning to the very end, so that not tool mark is left on the work.

Furthermore, the device is automatic so that the speed of the shaft of the lathe is automatically decreased as the work proceeds, and the machinist may set the machine into operation and leave it to perform the work automatically. In other words, the machine once set in operation, will carry out the work without any attention on the part of the machinist until the operation has been completed and a new piece of work is to be substituted for the one operated upon.

In order to accomplish the above objects, I combine a variable drive, preferably like one of those shown in my copending applications, with the lathe or other machine, in such manner that a portion of the lathe, preferably the slide rest, which carries the tool, is so connected with the variable drive that the speed of the lathe shaft is automatically varied in accordance with the progress of the operation upon the piece of work. The present device is simple and effective and it in no way interferes with the proper operation of the lathe and it does not interfere with the operation of the lathe in the ordinary manner when the automatic variable drive is to be thrown out of operation.

While I have shown my invention in the accompanying drawings as applied to a lathe, it will be understood that it may be applied to any other type of machine where it is desirable to have the speed of the machine automatically varied as the work of the machine progresses.

Other objects and advantages will appear in the following detailed description of my invention.

In the drawings forming part of this application,

Figure 1 is a front elevation of a portion of the lathe with my invention applied thereto, Figure 2 is a plan view of a portion of the same, Figure 3 is a detailed sectional view of the means for throwing the motor clutch into and out of operation, Figure 4 is a perspective view of the eccentric portion of the same device, Figure 5 is a cross section of the lathe showing the parts of my invention in end elevation, Figure 6 is a sectional view showing parts of the variable drive, Figure 7 is a detailed elevation showing the method of adjusting the drive independently of the lathe, Figure 8 is a sectional view showing the gear thrown into the rack to effect the operation of the carriage of the lathe, and Figure 9 is a similar view with the gear disengaged from the rack.

I have shown a motor and the parts of the drive mounted in an elevated position above the lathe on the bracket 1. In the upper portion of this bracket I have mounted the motor 2 in a horizontal position with its shaft extending through hubs 3 on the ends of brackets 4 which are cast integral with or are attached to the upper end of the bracket 1. I have shown a grooved pulley 5 which is mounted loosely on the motor shaft 6 and this pulley may be considered as a driving member of the drive device. There is a clutch for establishing a driving connection between the motor shaft and the pulley 5. The clutch member 7 is keyed or otherwise connected with the motor shaft to revolve with it and this is pressed into frictional engagement with one side of the pulley 5 in order to cause the pulley to revolve with the shaft.

There is a lever arm 8 pivoted from a boss 9 as shown in Figure 2, and this lever having a forked end 10 straddles the motor shaft and is provided with two rounded projections 11 which are adapted to press against the right hand end of the clutch member 7 in order to press this clutch member towards the pulley. In a bracket 12 extending laterally from a bracket 3 which forms one of the bearings for the motor shaft, there is revolvably mounted a shaft 13 which on its lower end carries a handle 14 by means of which the shaft may be rocked.

This shaft has an eccentric portion 15 which projects through an elongated slot 16 in a side extension of the lever arm 8 and a nut 17 threaded on the upper end of the eccentric stem 15 holds the parts in assembled position.

By turning the operating handle 14 in one direction the eccentric member 15 will rock the lever arm 8 and thus press the clutch member 7 against the pulley 5 and thereby cause the latter to revolve with the motor shaft. When the lever arm 14 is turned in the opposite direction the eccentric member 15 will shift the lever 8 to the right in Figure 2 and thus release or disengage the clutch. By means of this clutch device the variable drive may be thrown into and out of operation without having to start and stop the motor as it is preferable to have the motor run continuously.

The pulley 5 is the driving pulley and it is mounted on the motor shaft 6. The standard 1 has projecting forwardly from it a pair of brackets 18 in the forward ends of which there is journaled a shaft 19 which is adapted to slide axially in its bearings. This shaft has fixed to it a cam 20 in the groove of which engages a pin 21 mounted on the bracket 22 which latter is mounted on one of the brackets 18 and these parts cause the shaft 19 to be moved axially whenever the shaft is oscillated.

On the shaft 19 are mounted a pair of lever arms 23 the free ends of which are provided with bearings 24 in which there is journaled a shaft 25 which is spaced from or parallel with the shaft 19. On this shaft 25 are mounted the expansible pulleys A, B which are preferably like the expansible pulleys shown in my U. S. Patent No. 2,035,269, dated August 27, 1935, and to which reference may be had for a more detailed description of these pulleys and their function.

The flanges mounted on this shaft constitute an expansible pulley A and an expansible pulley B constituted by the two outer flanges 26, 27 which are keyed to revolve with the shaft 25 or pinned thereon; and by an intermediate flange member 28 which is keyed to revolve with the shaft and which is common to both pulleys. This intermediate flange 28 is adapted to move lengthwise of the shaft 25 although revolving therewith.

There is an endless belt 29 of the V type which travels around the pulley 5 on the motor shaft, by which it is driven, and also around the expansible pulley A. There is another endless belt 30 of the V type which engages around the expansible pulley B and around the V pulley 31 mounted on the shaft of the lathe. By rocking the shaft 19 the arms 23 are rocked with it and this causes the shaft 25 to be moved upwardly or downwardly, carrying the expansible pulleys A, B with it, and the pulleys increase and decrease in effective size when the shaft 25 is shifted in position, the same as in my co-pending application.

When the shaft 19 is rocked clockwise in Figure 5, the shaft 25 and the expansible pulleys are moved upwardly or towards the driving pulley 5 and the shaft 19 is moved to the right as viewed in Figure 1. This will cause the end flanges 26, 27 of the two pulleys A, B to be shifted to the right in Figure 1, a slight extent, and as a result the left hand flange member 26 approaches closer to the intermediate flange member 28 thereby bringing these members closer together and causing the loop of the belt 29 which travels around the pulley A to be increased in size, thereby changing the speed ratio as between the pulley 5 and the pulley A.

At the same time the right hand flange member 27 moves slightly to the right and away from the intermediate flange member 28 so that the loop of the belt 30 engaging around the pulley B decreases in size and effects a change in the speed ratio between the pulley B and the pulley 31 on the lathe. This change of conditions will cause the lathe to be operated at a relatively slow speed.

Conversely, when the shaft 19 is rocked counterclockwise as viewed in Figure 5, the parts will be brought to the condition shown in Figure 1 where the loop of the belt 29 around the pulley A is decreased and the loop of the belt 30 around the pulley B is increased so that there is a change of speed ratio and the shaft of the lathe is operated at relatively high speed. Between the two extremes there is a gradual variation in the speed ratio as between the pulley 5 on the shaft of the motor and the pulley 31 on the shaft of the lathe. When the parts are moved to the position shown in Figure 1 from the condition described above, the shaft 19 is moved axially a slight distance by the co-operation of the cam 20 and the pin 21 so that the two outer flange members 26, 27 of the expansible pulleys move from right to left in Figure 1 to effect the change in the pulleys described above. It will be apparent, therefore, that by rocking the shaft 19 the speed of the driven member which is the pulley 5 on the shaft of the lathe, will be increased or decreased.

I have shown hand means for rocking the shaft 19 to effect the variation of the drive independently of the lathe when it is desired to operate the lathe without the automatic device. For this purpose there is a toothed sector 32 shown as attached to one of the brackets 18. On the shaft 19 there is attached one end of the lever arm 33 the outer end of which is provided with an operating handle 34.

There is a locking member 35 slidably attached to the lever arm 33 and at one end it is provided with a pawl 36 which is adapted to engage between any of the teeth of the rack 32 for the purpose of locking the lever arm and therefore the shaft 19 in various positions. There is a small lever 37 mounted on the lever arm 33 near the handle 34 which is adapted to be operated by the hand which grasps the handle for the purpose of disengaging the pawl from the rack and for allowing it to engage therewith. There is a latch 38 on the lever 37 which is adapted to be engaged over the edge of the handle 34 for the purpose of holding the locking member 35 disengaged from the rack 32 whenever the drive device is to be automatically operated from the lathe.

I provide means automatically operated from the lathe for rocking the shaft 19 to effect variations in the speed of operation of the lathe, and this device performs the same function as the lever arm 33. There is attached to the shaft 19 one end of the lever arm 40 the latter preferably being fixed to the shaft by a pin or set screw 41 so that rocking motion of the lever arm causes a rocking motion of the shaft 19. Preferably this arm is adjustable along the shaft 19.

This arm preferably is curved backwardly of the lathe to be out of the way of the work being performed upon the lathe. At its lower end there is attached to the lever arm 40 a laterally extending rod 42 which preferably runs parallel to the axis of the lathe. There is a link 43 pivoted upon the rod 42 and this link extends forwardly and is secured by a screw 44 to the slide rest 45 of the lathe. No modification of the slide rest of the lathe is necessary for the application of this invention, except the application of the screw 44 to connect one end of the link 43 to the slide rest and the possible modification of the device shown in Figures 8 and 9.

The carriage 46 of the lathe is adapted to be moved parallel with the axis of the lathe shaft either by hand or by power means according to the character of the lathe. The slide rest is adapted to be moved by the crank 47.

The compound slide rest 48 is adapted to be operated by the hand crank 49 in the usual manner for positioning the tool 50 in relation to the piece of work. When the lathe carriage is moved lengthwise of the lathe the link 43 is carried with it and this link slides along the rod 42. Preferably the link 43 is guided in a slot 51 in a bracket 52 attached to the slide rest in order to assure the link 43 travelling with the slide rest.

Operation

If the drive is to be controlled through the hand lever 33 instead of automatically from the lathe, the link 43 may be disconnected from the slide rest and the lever arm 33 may be operated by hand to vary the drive ratio and to operate the lathe shaft at any desired speed; and in this respect the device will operate like the device shown in my Patent No. 2,035,269. When the drive is to be controlled by the lathe the latch 38 will be thrown into position to hold the locking member 35 disengaged from the sector 32 thus throwing the hand controlled means out of operation.

The link 43 is connected with the slide rest of the lathe in the manner shown in Figures 1 and 5. If a piece of work is attached to the face plate 53 of the lathe or to a chuck or any other holding means on the lathe, the tool 50 will be set into position, say, to start its cut near the axis of the lathe. This will be done by moving the lathe carriage up to the piece of work. The slide rest will be adjusted to bring the tool close to or at the axis of the piece of work and the compound slide rest may be adjusted to properly position the tool.

When the slide rest is in position so that the cutting tool will start at the central portion of the piece of work, the link 43 will be in such position that the drive will be operating at a relatively high ratio, that is to say, the shaft of the lathe will be operated at a high speed to accord with the small arc described by the tool on the piece of work while the tool is near the axis.

Let us say that a plate is being faced off on the lathe and that the tool starts to operate near the center of the face plate. As the work progresses, the slide rest will be moved from right to left in Figure 5 or toward the viewer in Figure 1, in order to move the tool from a point at or near the axis toward the outer portion of the piece of work. As the slide rest is moved in this operation, the link 43 acts on the rod 42 to rock the lever arm 40 and this rocks the shaft 19.

As has been previously described, the rocking of the shaft 19 effects a change in the speed ratio of the drive device and in the instance assumed, the shaft of the lathe will gradually decrease in speed as the tool cuts the work in relatively larger arcs, so that the speed of the work at the point of contact with the tool will remain substantially constant as the work progresses. That is to say, as the tool cuts on larger arcs on the work the shaft of the lathe decreases in order that the surface speed of the work in relation to the tool will remain substantially the same throughout the cutting operation.

Heretofore, it has been necessary to stop the lathe from time to time and shift the belt on the stepped pulleys to decrease the speed of the lathe as the work progressed. In the present case, however, the speed of the lathe is automatically varied as the work progresses, so that it is unnecessary to stop the lathe to change the speed and this avoids leaving tool marks on the piece of work.

If a piece of work involving the formation of a conical surface is to be performed on the lathe, the compound slide rest may be moved in either direction, according to the angle of the surface to be cut, and the operation of the compound rest may take place simultaneously with the lateral movement of the slide rest. However, it is only the movement of the slide rest which is lateral of the lathe which effects the change of speed ratio of the drive device because the particular movement of the compound slide rest need have no effect upon the speed of the lathe.

From the above it will be apparent that I have provided means operated automatically in conjunction with the lathe for changing its speed of operation through the drive, which change of speed is effected automatically while the lathe is in operation. Machines other than lathes, where it is desired to change the speed of the machine as the work progresses, may be supplied with my invention and the manner of applying it will be obvious from the application of the invention as shown herein.

Having described my invention, what I claim is:

1. The combination with a lathe having a shaft and a movable slide rest, a driving member operated from a source of power, a driven member on the shaft of the lathe, a plurality of expansible pulleys, an endless belt travelling around the driving member and one of said pulleys, an endless belt travelling around the other of said expansible pulleys and around the driven member, an oscillating shaft adapted to shift the positions of said expansible pulleys and to thereby effect the expansion and contraction of said pulleys, a lever arm on said oscillating shaft, a rod connected with said lever arm, and a lever arm connected with said rod and with said slide rest whereby the movement of the slide rest will effect the operation of said oscillating shaft for the purpose of automatically varying the speed ratio between the driving and driven members according to the movements of the slide rest.

2. The combination with a lathe having a shaft and a movable slide rest, a driving member operated from a source of power, a driven member on the shaft of the lathe, a plurality of expansible pulleys, an endless belt travelling around the driving member and one of said pulleys, an endless belt travelling around the other of said expansible pulleys and around the driven member, an oscillating shaft adapted to shift the positions of said expansible pulleys and to thereby effect the expansion and contraction of said pulleys, a lever arm on said oscillating shaft, a rod associated with said lever arm and extending parallel to the shaft of the lathe, a lever arm slidably associated with said rod, said latter lever arm pivotally connected with the slide rest whereby the movements of the slide rest laterally of the lathe will effect the oscillation of said oscillating shaft and thereby vary the speed ratio between the driving and driven members in accordance with the lateral movements of the slide rest.

3. The combination with a lathe having a shaft and a movable slide rest, a driving member operated from a source of power, a driven member on the shaft of the lathe, a plurality of expansible pulleys, an endless belt travelling around the driving member and one of said pulleys, an endless belt travelling around the other of said expansible pulleys and around the driven member, an oscillating shaft adapted to shift the positions of said expansible pulleys and to thereby effect the expansion and contraction of said pulleys, a lever arm on said oscillating shaft, a rod associated with said lever arm and extending parallel to the shaft of the lathe, and a lever arm slidably associated with said rod, said latter lever arm pivotally connected with the slide rest whereby the movements of the slide rest laterally of the lathe will effect the oscillation of said oscillating shaft and thereby vary the speed ratio between the driving and driven members in accordance with the lateral movements of the slide rest, and a bracket attached to the slide rest and having a slot in which said last mentioned lever arm engages whereby said last mentioned lever arm is moved along said rod when the slide rest moves lengthwise of the lathe.

4. The combination with a lathe having a shaft and a movable slide rest, a bracket mounted on the frame of the lathe, a motor mounted on said bracket, a driving pulley on the shaft of the lathe, a clutch and means for operating the same to throw said pulley into and out of operation on the motor shaft, a driven member on the shaft of the lathe, a plurality of expansible pulleys, an endless belt of the V type travelling around said first driving pulley and one of said expansible pulleys, another endless belt of the V type engaging around the other of said expansible pulleys and the driven member on said lathe shaft, an oscillating shaft having means for shifting said expansible pulleys to vary the speed ratio between the driving pulley and the driven member on the lathe, a lever arm associated with said oscillating shaft, a horizontally extending bar carried by said lever arm, another lever arm associated with said bar and pivotally connected with said slide rest whereby the lateral movements of the slide rest will operate said oscillating shaft to vary the speed ratio between said driving and said driven members.

OSCAR I. JUDELSHON.